(12) United States Patent
Lee

(10) Patent No.: US 8,805,452 B2
(45) Date of Patent: Aug. 12, 2014

(54) CONDUCTIVE EAR FLANGE FOR EXTENDING THE RANGE OF A SENSOR IN A COMMUNICATIONS DEVICE

(75) Inventor: Barry Lee, Santa Cruz, CA (US)

(73) Assignee: Plantronics, Inc., Santa Cruz, CA (US)

( * ) Notice: Subject to any disclaimer, the term of this patent is extended or adjusted under 35 U.S.C. 154(b) by 87 days.

(21) Appl. No.: 13/357,801

(22) Filed: Jan. 25, 2012

(65) Prior Publication Data

US 2013/0190058 A1 Jul. 25, 2013

(51) Int. Cl.
*H04M 1/00* (2006.01)

(52) U.S. Cl.
USPC .......................... 455/569.1; 381/74; 381/380

(58) Field of Classification Search
USPC ................... 455/569.1; 381/74, 375
See application file for complete search history.

(56) References Cited

U.S. PATENT DOCUMENTS

| | | | | |
|---|---|---|---|---|
| 4,654,898 A * | 4/1987 | Ishikawa | ........................... | 2/209 |
| 7,181,024 B1 * | 2/2007 | Oba et al. | ........................ | 381/77 |
| 8,270,656 B2 * | 9/2012 | Stiehl et al. | .................... | 381/380 |
| 8,280,093 B2 * | 10/2012 | Siahaan et al. | ................ | 381/380 |
| 8,304,733 B2 * | 11/2012 | Alameh et al. | ................ | 250/349 |
| 8,335,312 B2 * | 12/2012 | Gerhardt et al. | .............. | 379/430 |
| 8,340,335 B1 * | 12/2012 | Shennib | ........................ | 381/328 |
| 8,472,660 B2 * | 6/2013 | Wengreen | ..................... | 381/385 |
| 2008/0002835 A1 * | 1/2008 | Sapiejewski et al. | ........ | 381/71.6 |
| 2009/0103764 A1 * | 4/2009 | Stiehl et al. | .................... | 381/380 |
| 2009/0262952 A1 * | 10/2009 | Kuhtz et al. | ..................... | 381/74 |
| 2009/0274317 A1 * | 11/2009 | Kahn et al. | ...................... | 381/74 |
| 2009/0290742 A1 * | 11/2009 | Rosener | ........................ | 381/375 |
| 2010/0246860 A1 * | 9/2010 | Rye et al. | ....................... | 381/151 |
| 2010/0246879 A1 * | 9/2010 | Siahaan et al. | ................ | 381/380 |
| 2011/0007908 A1 | 1/2011 | Rosener et al. | | |
| 2011/0182458 A1 | 7/2011 | Rosener et al. | | |
| 2012/0033822 A1 * | 2/2012 | Kakumoto | ................... | 381/71.6 |
| 2012/0039500 A1 * | 2/2012 | Silvestri et al. | ................ | 381/380 |
| 2012/0051574 A1 * | 3/2012 | Lin | ................................ | 381/353 |
| 2012/0099738 A1 * | 4/2012 | Lee et al. | ......................... | 381/74 |
| 2012/0243704 A1 * | 9/2012 | Sorensen | ......................... | 381/74 |
| 2012/0281850 A1 * | 11/2012 | Hyatt | ............................... | 381/74 |

* cited by examiner

*Primary Examiner* — Nathan Taylor
(74) *Attorney, Agent, or Firm* — Michael D. Rodriguez

(57) ABSTRACT

A headset comprising a communications device, a sensor coupled to the communications device and operative to detect the proximity of a user's body to the sensor, a detachable ear cushion coupled to the communications device; and wherein the detachable ear cushion comprises a conductive ear cushion flange to be interposed between the sensor and the user's body for extending the detection range of the sensor.

29 Claims, 5 Drawing Sheets

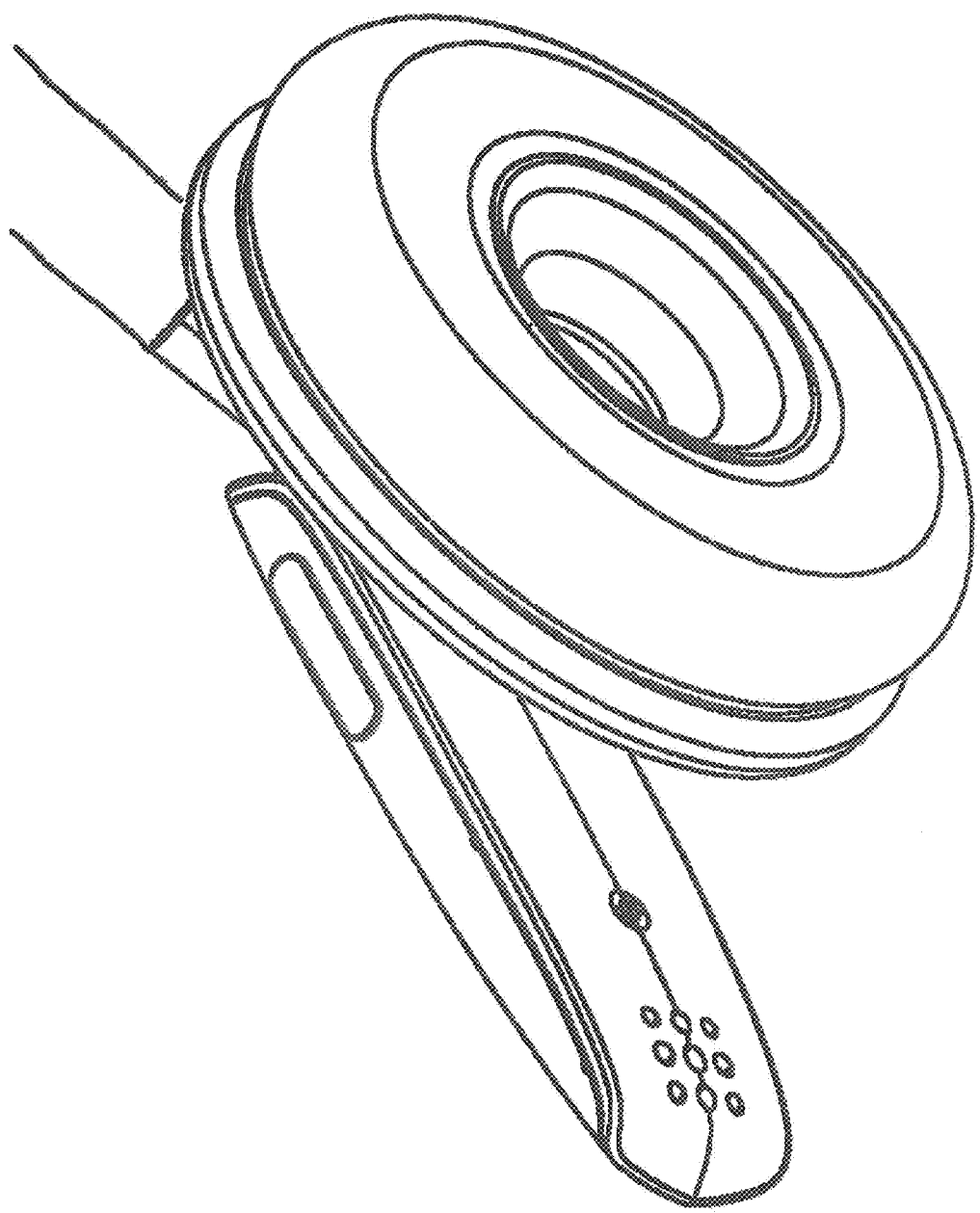

CONDUCTIVE EAR FLANGE FOR EXTENDING THE RANGE OF A SENSOR IN A COMMUNICATIONS DEVICE

FIELD OF INVENTION

The present invention relates to communications headsets, and more particularly, to an apparatus, system and method for extending the detection range of a sensor in a communications device.

BACKGROUND OF THE INVENTION

Communications headsets in general can be used in a diversity of applications and are particularly effective for telephone operators, office administrators, and other individuals for whom it is desirable to have "hands free" operation of communication systems.

Communications headsets may either be monaural or binaural. Binaural headsets are communications headsets which have two audio receivers situated near each ear of a wearer and are generally worn with a headband and ear cushions. Monaural headsets are communications headsets which have only a single audio receiver situated near one ear. Monaural headsets may be worn in either one of three styles: 1) in the ear 2) over the ear with an ear bud and ear loop or 3) headband with an ear cushion.

Some communications headsets may further be equipped with donned/doffed sensors that detect whether the communications headset has been "donned", i.e., placed on the head of a wearer for communications purposes, or "doffed", i.e., removed from the wearer's head.

In cases where an individual with a monaural communications device equipped with donned/doffed sensors desires to convert from an in the ear or over the ear with an ear bud and ear loop wearing style to a headband with an ear cushion wearing style, may experience false detections or no detections from the donned/doffed sensors. This problem may arise when the donned/doffed sensors are positioned in close proximity to the ear and tuned, for example, for an in the ear bud and ear loop wearing style so that the donned/doffed sensors fall out of range and no longer detect the presence of the ear when the user converts to a headband with an ear cushion wearing style. Conversely, if the donned/doffed sensors are tuned to function in the headband with the ear cushion wearing style, they will be far too sensitive when a user converts to the in the ear or over the ear with an ear bud and ear loop wearing styles such that the sensors will give too many false detections to be meaningful and valuable.

Therefore it is desirable to have a monaural communications headset equipped with donned/doffed sensors that may be converted from an in the ear or over the ear with an ear bud and ear loop wearing style to a headband and ear cushion wearing style that provides more accurate results in detecting the presence of the wearer's ear.

SUMMARY OF THE INVENTION

According to one embodiment of the invention, a headset comprising a communications device, a sensor coupled to the communications device and operative to detect the proximity of a user's body to the sensor, a detachable ear cushion coupled to the communications device, and wherein the detachable ear cushion comprised a conductive ear cushion flange to be interposed between the sensor and the user's body for extending the detection range of the sensor. The conductive ear cushion flange may comprise an electrostatic charge dissipative material, thermoplastic polyolefin elastomer (TEO) having a volume resistivity of from about 1.0E2 to about 9.9E9 ohm.cm, or an elastomer containing particles of an electrically conductive material. The communication device may comprise a first sensor and a second sensor wherein the first sensor is positioned to detect the proximity of a user's cavum and the second sensor is positioned to detect the proximity of a user's tragus. The ear cushion flange may be interposed between the first sensor and the user's eavum and may also be interposed between the second sensor and the user's tragus. The sensor of the headset may be a capacitive sensor or a DON/DOFF sensor. The communications device of the headset may comprise a microphone and a speaker for providing audio to a user's ear. The ear cushion of the headset may also comprise a headband.

In another embodiment of the invention, a system for extending the detection range of a sensor in a headset comprises a communications device, a sensor coupled to the communications device and operative to detect the proximity of a user's body to the sensor, a detachable ear cushion coupled to the communications device, and wherein the detachable ear cushion comprises a conductive ear cushion flange to be interposed between the sensor and the user's body for extending the detection range of the sensor. The conductive ear cushion flange may comprise an electrostatic charge dissipative material, thermoplastic polyolefin elastomer (TEO) having a volume resistivity of from about 1.0E2 to about 9.9E9 ohm.cm, or an elastomer containing particles of an electrically conductive material. The communication device may comprise a first sensor and a second sensor wherein the first sensor is positioned to detect the proximity of a user's cavum and the second sensor is positioned to detect the proximity of a user's tragus. The ear cushion flange may be interposed between the first sensor and the user's cavum and may also be interposed between the second sensor and the user's tragus. The sensor of the system may be a capacitive sensor or a DON/DOFF sensor. The communications device of the system may comprise a microphone and a speaker for providing audio to a user's ear. The ear cushion of the system may also comprise a headband.

In another embodiment of the invention, a method for extending the detection range of a sensor in a headset, the headset includes a communication device, a sensor coupled to the communications device and operative to detect the proximity of a user's body to the sensor, the method comprising coupling a detachable ear cushion to the communications device and wherein the detachable ear cushion comprises a conductive ear cushion flange to be interposed between the sensor and the user's body for extending the detection range of the sensor. The conductive ear cushion flange may comprise an electrostatic charge dissipative material, thermoplastic polyolefin elastomer (TEO) having a volume resistivity of from about 1.0E2 to about 9.9E9 ohm.cm, or an elastomer containing particles of an electrically conductive material. The communication device may comprise a first sensor and a second sensor wherein the first sensor is positioned to detect the proximity of a user's cavum and the second sensor is positioned to detect the proximity of a user's tragus. The ear cushion flange may be interposed between the first sensor and the user's cavum and may also be interposed between the second sensor and the user's tragus. The sensor coupled to the communications device may be a capacitive sensor or a DON/DOFF sensor. The communications device may comprise a microphone and a speaker for providing audio to a user's ear. The ear cushion of the communications device may also comprise a headband.

BRIEF DESCRIPTION OF THE DRAWING

The present invention will be readily understood by the following detailed description in conjunction with the accompanying drawings, wherein like reference numerals designate like structural elements.

FIG. 5 shows top perspective views of the communications device 100 attached to ear cushion 200, according to one embodiment of the invention.

DETAILED DESCRIPTION

Systems, methods, and apparatuses for extending the detection range of a sensor in a communications device are disclosed. The following description is presented to enable an ordinarily skilled person in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For the purpose of clarity, material that is known in the technical fields related to the invention has not been described in detail so as not to unnecessarily obscure the present invention.

Figure 1:
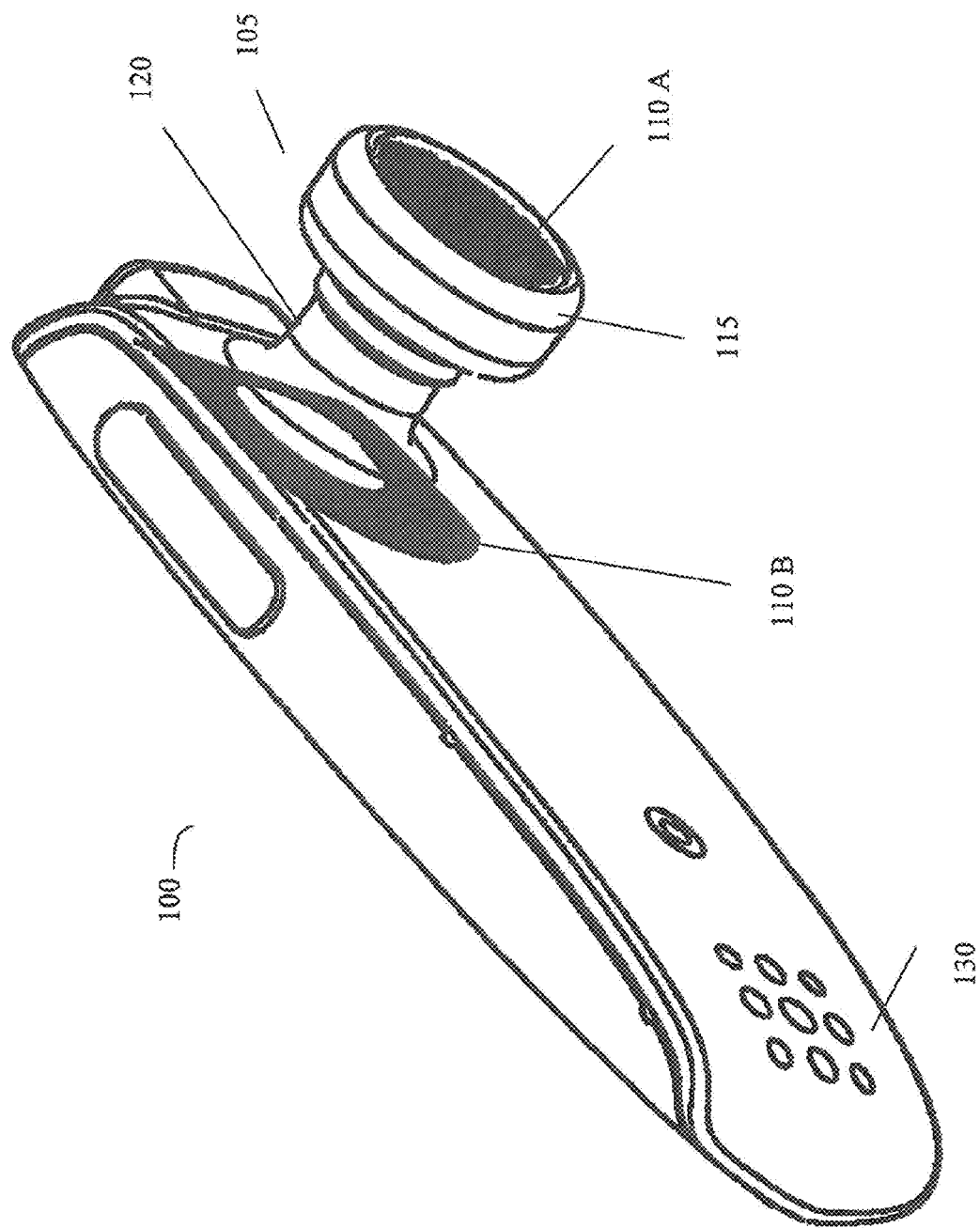
FIG. 1 illustrates a communication device 100, according to one embodiment of the invention.

FIG. 1 illustrates a communication device 100, according to one embodiment of the invention. The communications device 100 comprises an ear bud 105, sensors 110 A and 110 B, a speaker 115, an ear bud stem 120, and a microphone 130.

The communications device 100 provides audio signals to a user's ear. The communications device 100 includes an audio driver (not shown) to convert an audio signal received via cord or wirelessly, to an audible output via the speaker 115. The speaker 115 is housed by the ear bud 105. The ear bud 105 is supported by the ear bud stem 120. The ear bud 105 and ear bud stem 120 may be used as attaching points for attaching the communications device 100 to an ear cushion such as ear cushion 200 shown in FIG. 2. The communications device 100 may also include sensors 110 A and 110 B. Sensors 110 A and 110 B may be capacitive sensors or more specifically donned/doffed sensors that detect whether the communications headset has been "donned", i.e., placed on the head of a wearer for communications purposes, or "doffed", i.e., removed from the wearer's head. According to one embodiment, sensor 110 A may be positioned in the communications device 100 to detect the proximity of a user's cavum, and sensor 110 B may be positioned in the communications device 100 to detect the proximity of a user's tragus. The sensitivity of sensor 110 A and 110 B may be tuned for when the communications device 100 is in close proximity to the eat such as when the communication device 100 is to be worn in the over the ear with an ear bud and earloop wearing style or in the ear wearing style. The communications device 100 also includes a microphone 130 located at the tip of the communications device 100. The microphone 130 may comprise a noise cancelling microphone.

Figure 2:
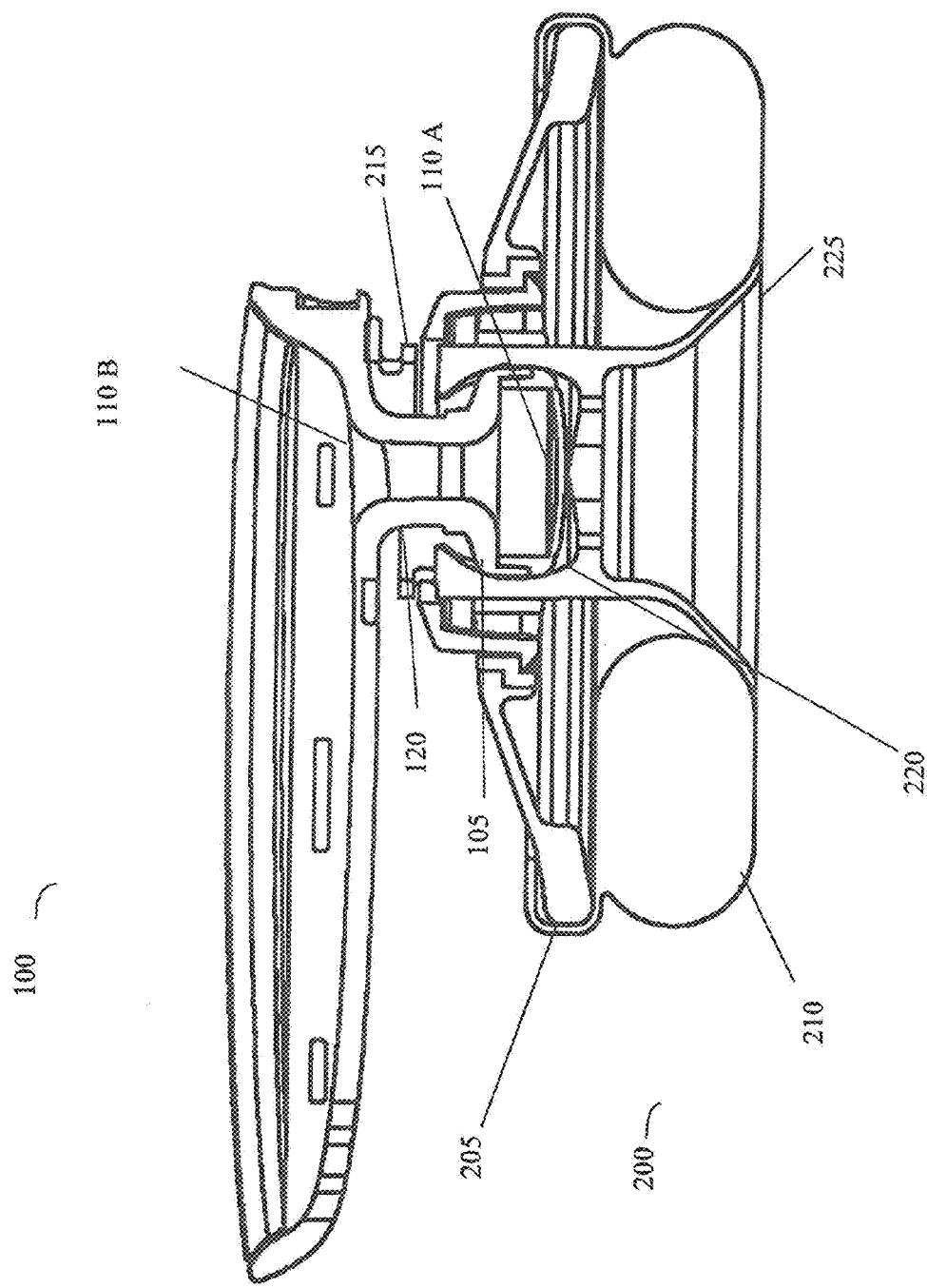
FIG. 2 shows a cross sectional view of the communications device 100 attached to an ear cushion 200, according to one embodiment of the invention.

FIG. 2 shows a cross sectional view of the communications device 100 attached to an ear cushion 200, according to one embodiment of the invention. The ear cushion 200 comprises an ear cushion flange 205 and an ear pad 210. The ear cushion flange 205 further comprises an ear bud stem connector 215, an ear bud attachment recess 220, and an ear flange trumpet 225.

The ear bud 105 and the ear bud stem 120 of the communications device 100 can be attached to the ear cushion flange 205 of the ear cushion 200. More specifically the ear bud 105 and the ear bud stein 120 can be attached at the ear bud stem connector 215 and ear bud attachment recess 220. To connect the ear bud 105 and the ear bud stem 120 to the ear bud stem connector 215 and the ear bud attachment recess 220, a user may push the ear bud 105 and ear bud stem 120 into the ear bud attachment recess 220 which causes the ear bud 105 and attachment recess 220 to act like a ball and socket with a friction fit.

The ear cushion flange 205 may be made of a variety of partially conductive materials, including, for example, "ESD A 2800-75 A," comprising a thermoplastic polyolefin elastomer (TEO) material manufactured by the RTP Company of Winona, Minn., having a volume resistivity of 1.0 E3-9.9E9 ohm.cm, a surface resistivity of 1.0E6-9.9E12 ohm/sq and a surface resistance of 1.0E5-9.9E11 ohm, The thermoplastic polyolefin elastomer material may also have a volume resistivity of 1.0 E2-1.0 E3 ohm.cm, Other partially conductive materials can be confected by "loading" elastomeric materials that are otherwise electrically insulative, such as rubber, polyurethane (PU), or the like, with particles of an electrically conductive material, e.g., carbon, silver or copper.

Once the communications device 100 is attached to the ear cushion flange 205, the inner surface of the ear bud attachment recess 220 is in contact with sensor 110 A and the surface of the ear stem connector 215 is in contact with sensor 110 B. The trumpet like geometry of the ear flange trumpet 225 of the ear cushion flange 205 allows the ear flange trumpet 225 to come into areas of the user's ear that will contact or become extremely close to the user's ear. The conductive material of the ear flange trumpet 225 provides the capacitive sensors 110 A and 110 B the means to extend its sensing of the ear when the ear cushion 200 is attached. More specifically, when the ear flange trumpet 225 contacts or come in close proximity of the ear, the conductive material of the ear flange trumpet 225 extends the proximity of the user's ear to capacitive sensors 110 A and 110 B to mimic the cavum and the tragus respectively. This allows the sensitivity of sensors 110 A and 110 B of the communication device 100 to be at one sensitivity level regardless if the communication device 100 is being worn by the user in one of the following wearing styles: 1) in the ear, 2) over the ear with an ear bud and ear loop or 3) headband.

Figure 3:
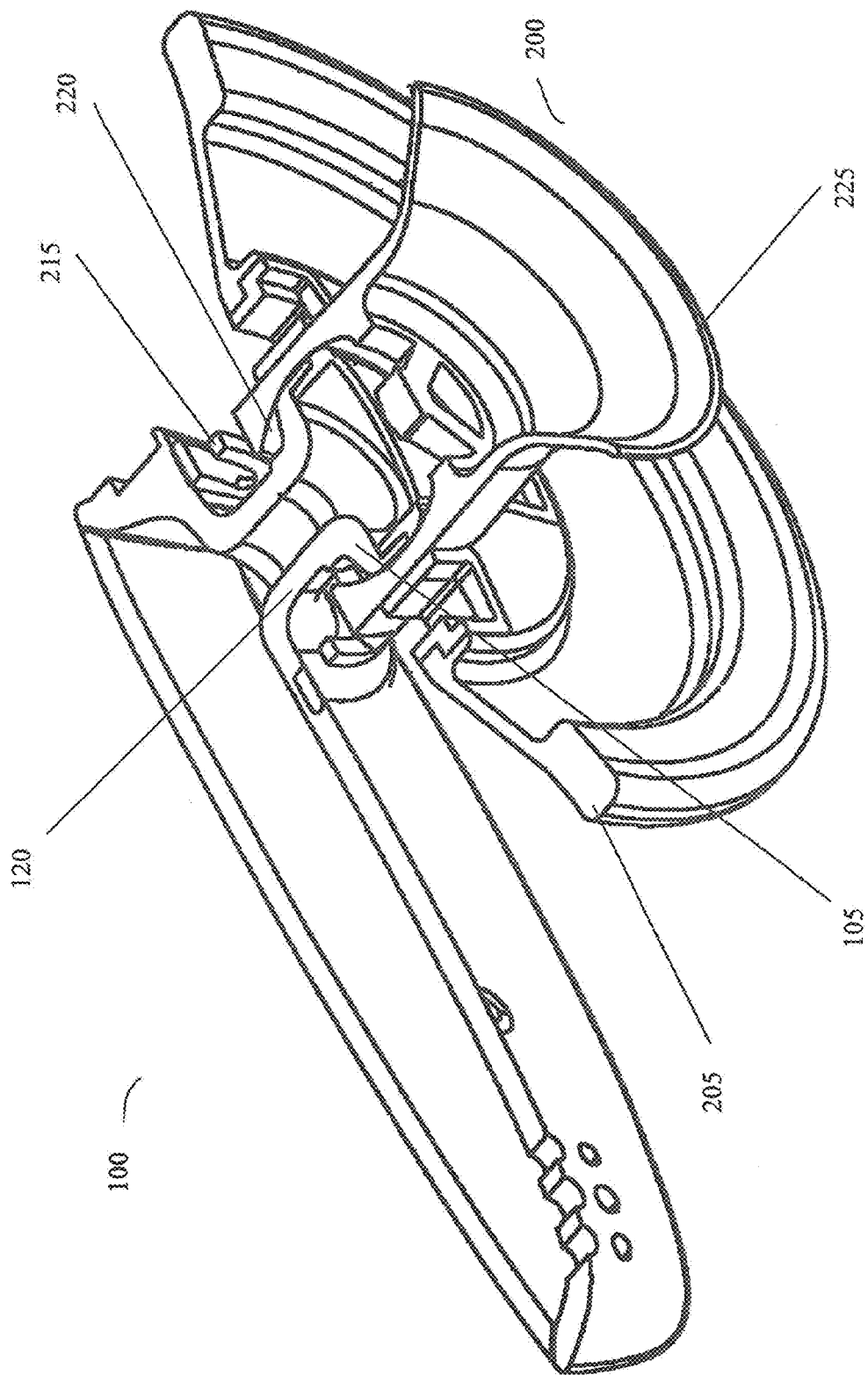
FIG. 3 shows a top perspective cross sectional view of the communications device 100 attached to ear cushion 200 without the ear pad 210, according to one embodiment of the invention.

FIG. 3 shows a top perspective cross sectional view of the communications device 100 attached to ear cushion 200 without the ear pad 210, according to one embodiment of the invention.

Figure 4:
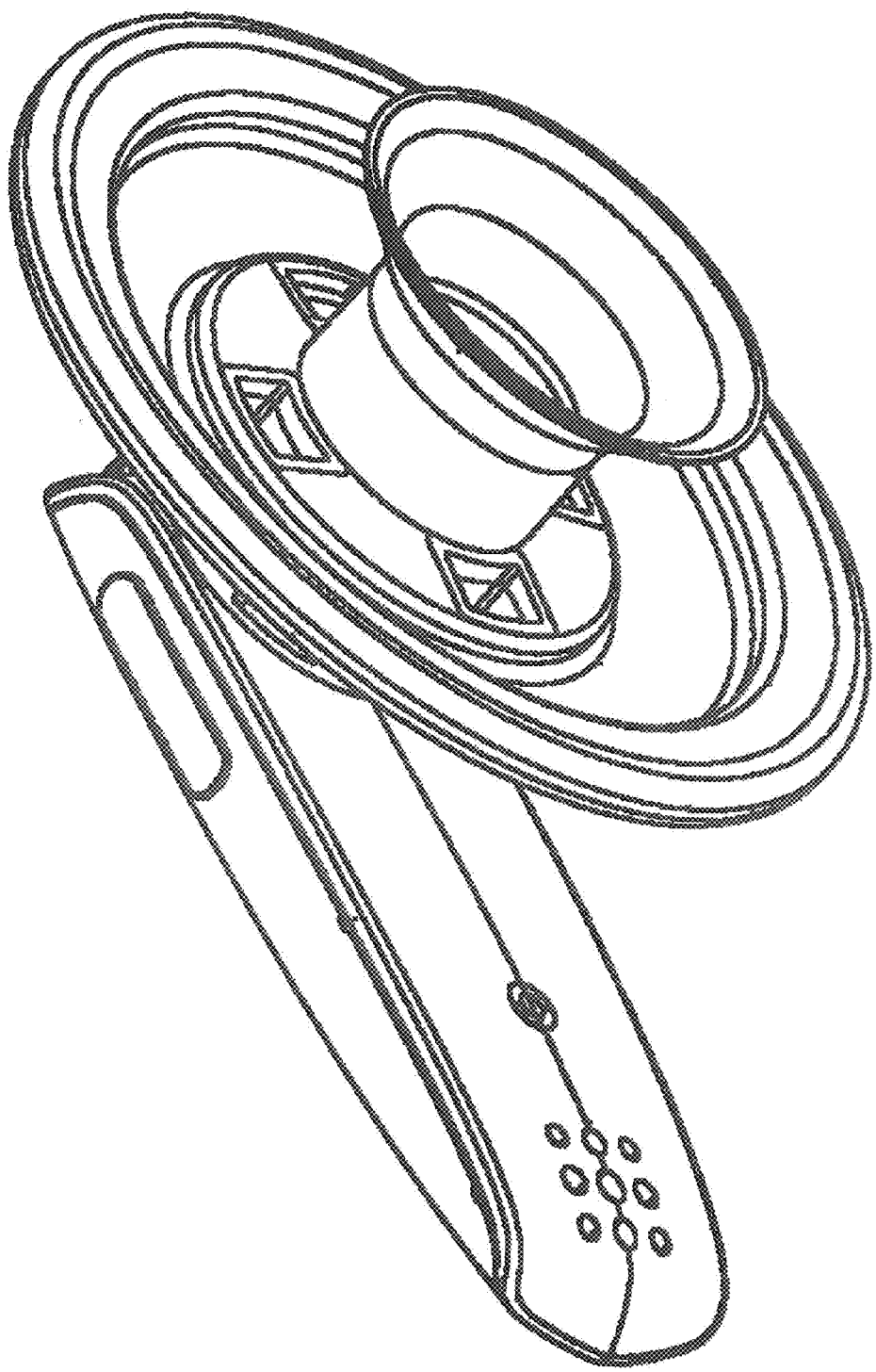
FIG. 4 shows a top perspective views of the communications device 100 attached to ear cushion 200 without the ear pad 210, according to one embodiment of the invention.

FIG. 4 and FIG. 5 show top perspective views of the communications device 100 attached to ear cushion 200, according to one embodiment of the invention. FIG. 4 shows the ear cushion 200 without the ear pad 210 while FIG. 5 show the ear cushion 200 with the ear pad 210.

Although the present invention has been described with reference to specific embodiments thereof, these embodiments are merely illustrative, and not restrictive of, the present invention. Various modifications or changes to the specifically disclosed exemplary embodiments will be suggested to persons skilled in the art. In summary, the scope of the invention should not be restricted to the specific exemplary embodiments disclosed herein, and all modifications that are readily suggested to those of ordinary skill in the art should be included within the spirit and scope of the invention.

What is claimed is:

1. A headset comprising:
a communications device;
a sensor coupled to the communications device and operative to detect the proximity of a user's body to the sensor;
an ear bud coupled to the communications device; and
a detachable ear cushion coupled to the communications device, wherein the detachable ear cushion comprises a conductive ear cushion flange to be interposed between the sensor and the user's body for extending the detection range of the sensor, the headset configured to be worn in a first wearing mode when the detachable ear cushion is coupled to the communications device and the headset configured to be worn in a second wearing mode when the detachable ear cushion is detached from the communications device.

2. The headset of claim 1, wherein the conductive ear cushion flange comprises a thermoplastic polyolefin elastomer (TEO) having a volume resistivity of from about 1.0E2 to about 9.9E9 ohm.cm.

3. The headset of claim 1, wherein the conductive ear cushion flange comprises an elastomer containing particles of an electrically conductive material.

4. The headset of claim 1, wherein the communication device comprises a first sensor and a second sensor.

5. The headset of claim 4, wherein the first sensor is positioned to detect the proximity of a user's cavum and the second sensor is positioned to detect the proximity of a user's tragus.

6. The headset of claim 5, wherein the conductive ear cushion flange is interposed between the first sensor and the user's cavum and interposed between the second sensor and the user's tragus.

7. The headset of claim 1, wherein the sensor is a capacitive sensor.

8. The headset of claim 1, wherein the sensor is a donned/doffed sensor.

9. The headset of claim 1, wherein the communications device comprises:
a microphone; and
a speaker for providing audio to a user's ear.

10. The headset of claim 1, wherein the ear cushion comprises a headband.

11. The headset of claim 1, wherein the detachable ear cushion is disposed over the ear bud.

12. The headset of claim 1, wherein the sensitivity level of the sensor is generally the same when the ear cushion is not coupled to the communication device relative to when the ear cushion is coupled to the communications device.

13. A system for extending the detection range of a sensor in a headset, comprising:
a communications device;
a first sensor coupled to the communications device and operative to detect the proximity of a user's body to the sensor, wherein the first sensor is positioned to detect the proximity of a user's cavum;
a second sensor coupled to the communications device positioned to detect the proximity of a user's tragus;
an ear bud coupled to the communications device; and
a detachable ear cushion coupled to the communications device, wherein the detachable ear cushion comprises a conductive ear cushion flange to be interposed between the sensor and the user's body for extending the detection range of the sensor.

14. The system of claim 13, wherein the conductive ear cushion flange comprises a thermoplastic polyolefin elastomer (TEO) having a volume resistivity of from about 1.0E2 to about 9.9E9 ohm.cm.

15. The system of claim 13, wherein the conductive ear cushion flange comprises an elastomer containing particles of an electrically conductive material.

16. The system of claim 13, wherein the conductive ear cushion flange is interposed between the first sensor and the user's cavum and interposed between the second sensor and the user's tragus.

17. The system of claim 13, wherein the sensor is a capacitive sensor.

18. The system of claim 13, wherein the sensor is a donned/doffed sensor.

19. The system of claim 13, wherein the communications device comprises:
a microphone; and
a speaker for providing audio to a user's ear.

20. The system of claim 13, wherein the ear cushion comprises a headband.

21. The system of claim 13, wherein the detachable ear cushion is disposed over the ear bud.

22. The system of claim 13, wherein the sensitivity level of the sensor is generally the same when the ear cushion is not coupled to the communication device relative to when the ear cushion is coupled to the communications device.

23. A method for extending the detection range of a sensor in a headset, the headset includes a communication device, a first sensor coupled to the communications device and operative to detect the proximity of a user's body to the sensor, an ear bud coupled to the communications device, the method comprising:
coupling a detachable ear cushion to the communications device, wherein the detachable ear cushion comprises a conductive ear cushion flange to be interposed between the first sensor and the user's body for extending the detection range of the sensor;
operating the communications device in a first wearing mode with the detachable ear cushion coupled;
detaching the detachable ear cushion from the communications device; and
operating the communications device in a second wearing mode with the detachable ear cushion detached.

24. The method of claim 23, wherein the conductive ear cushion flange comprises an electrostatic charge dissipative material.

25. The method of claim 23, wherein the conductive ear cushion flange comprises an elastomer containing particles of an electrically conductive material.

26. The method of claim 23, wherein the communication device further comprises a second sensor.

27. The method of claim 26, further comprising
detecting the proximity of a user's cavum using the first sensor; and
detecting the proximity of a user's tragus using the second sensor.

28. The method of claim 23, wherein the first sensor is a capacitive sensor.

29. The method of claim 23, wherein the ear cushion comprises a headband.

* * * * *